(12) United States Patent
Lin et al.

(10) Patent No.: US 11,537,349 B2
(45) Date of Patent: Dec. 27, 2022

(54) LIGHT CABINET SUITABLE FOR FORMING LIGHT WALL

(71) Applicant: Novatek Microelectronics Corp., Hsinchu (TW)

(72) Inventors: Wen-Chi Lin, Yilan County (TW); Yuan-Yung Liao, Hsinchu County (TW); Chung-Wen Wu, Yilan County (TW); Chi-Han Lee, New Taipei (TW); Jiun-Yi Lin, Taichung (TW); Po-Jui Huang, Hsinchu County (TW); Chung-Wen Hung, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/216,701

(22) Filed: Mar. 30, 2021

(65) Prior Publication Data
US 2022/0317965 A1   Oct. 6, 2022

(51) Int. Cl.
*G06F 3/14*      (2006.01)
*F21V 23/00*     (2015.01)
*G09G 5/00*      (2006.01)

(52) U.S. Cl.
CPC .......... *G06F 3/1446* (2013.01); *F21V 23/005* (2013.01); *G09G 5/006* (2013.01); *G09G 2300/026* (2013.01); *G09G 2352/00* (2013.01); *G09G 2360/04* (2013.01)

(58) Field of Classification Search
None
See application file for complete search history.

(56) References Cited

U.S. PATENT DOCUMENTS

| | | | |
|---|---|---|---|
| 2005/0128100 A1* | 6/2005 | Petrocy | G09F 11/29 340/9.1 |
| 2014/0160101 A1* | 6/2014 | Chen | G06T 7/0002 345/207 |

* cited by examiner

*Primary Examiner* — Gustavo Polo
(74) *Attorney, Agent, or Firm* — JCIPRNET

(57) ABSTRACT

The disclosure provides a light cabinet, including multiple light boards and multiple light-board controllers. The light boards form a first light-board array of the light cabinet. The light-board controllers are arranged one-to-one on the light boards. The light-board controllers of the light boards in a first column of the first light-board array are connected in series to form a first controller string. The output terminal of the first controller string is connected electrically to an input terminal of a second controller string in a corresponding column of a second light-board array of another light cabinet. The input terminal of the first controller string is connected electrically to a first output terminal of a video data splitter (or an output terminal of a third controller string in a corresponding column of a third light-board array of yet another light cabinet).

19 Claims, 3 Drawing Sheets

LIGHT CABINET SUITABLE FOR FORMING LIGHT WALL

BACKGROUND

Technical Field

The disclosure relates to a light wall (a display wall), particularly to a light cabinet suitable for forming a light wall.

Description of Related Art

Light walls (display walls) have been widely used in our lives. For example, advertising billboards and commercial signboards among other equipments are implemented using light walls. Generally speaking, a light wall is composed of multiple light cabinets along with other devices. Each light cabinet includes a light-cabinet controller and multiple light boards. And with a video data splitter, an image frame may be divided into multiple areas, where one of the areas is distributed/provided to a light-cabinet controller through the high definition multimedia interface (HDMI). Each light board includes a light array and a light-board controller. The light-cabinet controller divides the area provided by the video data splitter into multiple sub-areas, and distributes each of the sub-areas to a corresponding light-board controller among many other light-board controllers. According to the pixel data of the sub-area, the light-board controller controls the drivers to drive the light array through a serial peripheral interface (SPI) bus.

Note here that the content in the section of "Description of Related Art" is used to help understand the present disclosure. Part of the content (or all of the content) disclosed in the section of "Description of Related Art" may not be the conventional technology known to those with ordinary knowledge in the art. The content disclosed in the section of "Description of Related Art" does not mean that the content has been known to those with ordinary knowledge in the art before the application of the present disclosure.

SUMMARY

The disclosure provides a light cabinet suitable for forming a light wall (a display wall).

In an embodiment of the present disclosure, the light cabinet includes multiple light boards and multiple light-board controllers. The light boards form a first light-board array of the light cabinet. The light-board controllers are configured one-to-one on the light boards. The light-board controllers of the light boards in the first column of the first light-board array are connected in series to form the first controller string. The output terminal of the first controller string is adapted to be connected electrically to an input terminal of the second controller string in the corresponding column of the second light-board array of another light cabinet. The input terminal of the first controller string is adapted to be connected electrically to the first output terminal of a video data splitter (or an output terminal of the third controller string in a corresponding column of the third light-board array of yet another light cabinet).

Based on the above, the light cabinet does not need to be equipped with a light-cabinet controller. In some embodiments, the video data splitter sends the pixel data stream directly to at least one light-board controller of the light cabinet. In some embodiments, a light-board controller string of one light cabinet sends the pixel data stream directly to a corresponding light-board controller string of another light cabinet.

In an embodiment of the present disclosure, the light cabinet includes multiple light boards and multiple light-board controllers. The light boards form a light-board array of the light cabinet. The light-board controllers are configured one-to-one on the light boards. Any one of the light boards includes a light array and multiple driver circuits. The driver circuits are connected in series to form a driver circuit string. The input terminal of the driver circuit string is coupled to a corresponding one of the light-board controllers. The driver circuits are controlled by the corresponding light-board controller to drive the light array.

Based on the above, the driver circuits of any light board of the light cabinet are connected in series to form a driver circuit string. In one of the light boards, the light-board controller is connected electrically to one driver circuit of the driver circuit string, and does not need to be connected electrically to each driver circuit of the driver circuit string. Therefore, the number and length of wires between the light-board controller and the driver circuits are reduced evidently.

In order to make the aforementioned features and advantages of the disclosure more comprehensible, embodiments accompanied with drawings are described in detail below.

DESCRIPTION OF THE EMBODIMENTS

Figure 1:
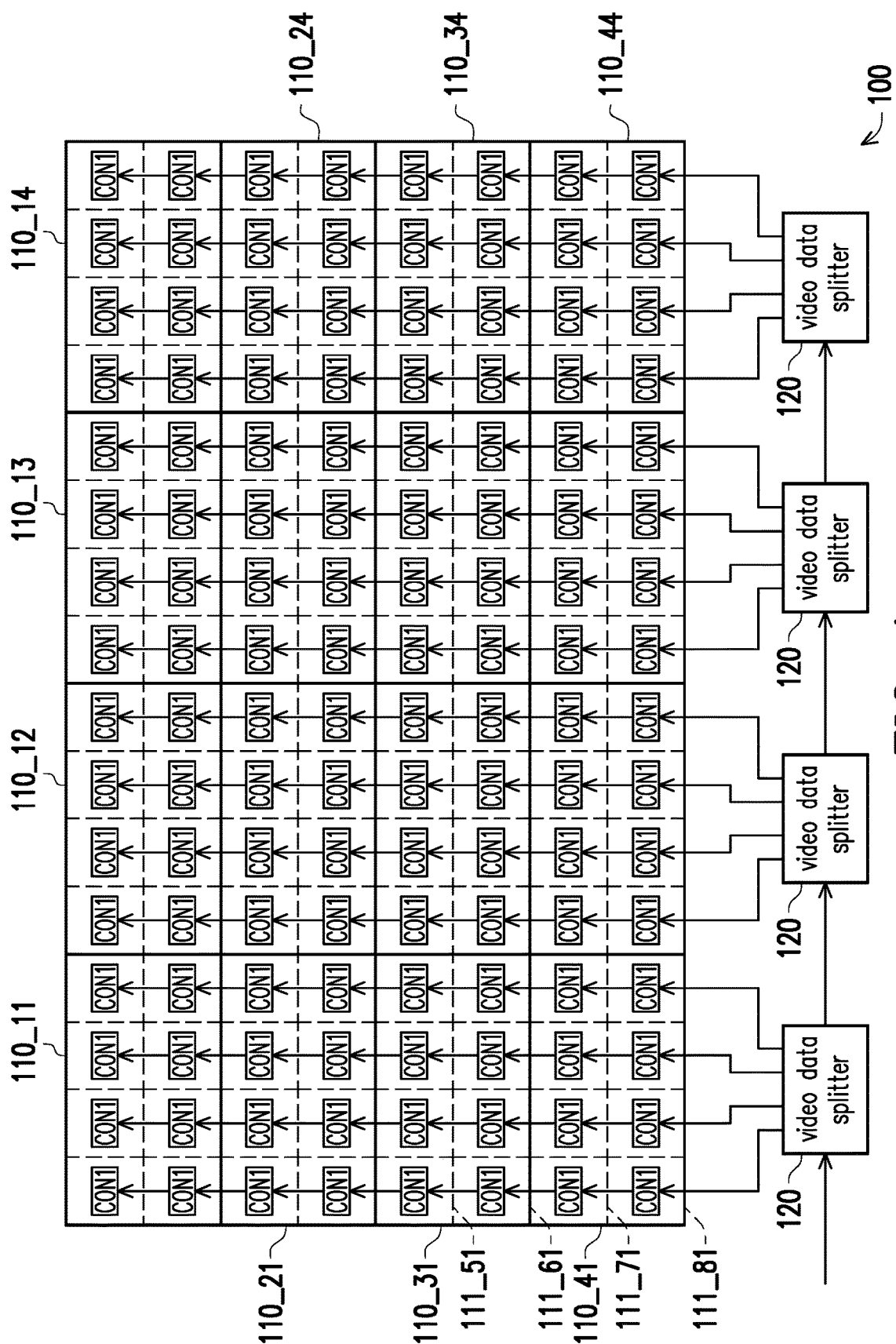
FIG. 1 is a schematic diagram of a circuit block of a light wall according to an embodiment of the present disclosure.

The term "coupling (or connection)" used in the full text of the present application (including the scope of the claims) may refer to any direct or indirect connection. For example, if the text describes that the first device is coupled (or connected) to the second device, it should be interpreted as that the first device is directly connected to the second device, or that the first device is indirectly connected to the second device through other devices or some other connection. The terms "first" and "second" mentioned in the full text of the description of the present application (including the scope of the claims) are used to name the element, or to distinguish between different embodiments or ranges, but are not used to limit the upper or lower limit of the number of elements or the order of components. In addition, wherever possible, elements/components/steps with the same reference numbers in the drawings and embodiments represent the same or similar parts. The descriptions of the elements/components/steps that use the same reference numerals or the same terms in different embodiments may be the mutual references of one another.

FIG. 1 is a schematic diagram of a circuit block of a light wall (a display wall) 100 according to an embodiment of the present disclosure. The resolution of the light wall 100 may be determined according to actual design. For example, the resolution of the light wall 100 may be 3840*2160. The light wall 100 includes a plurality of light cabinets and at least one video data splitter 120. The number of the light cabinets of the light wall 100 may be determined according to actual design. For example, the light wall 100 shown in FIG. 1 includes 4*4 light cabinets. For example, there are light cabinets 110_11, 110_12, 110_13, 110_14, 110_21, 110_24, 110_31, 110_34, 110_41, and 110_44 in FIG. 1. The resolution of each light cabinet may be determined according to actual design. For example, in the embodiment shown in FIG. 1, the resolution of each light cabinet may be 960*540.

The number of a video data splitter 120 may be determined according to actual design. Corresponding to a plurality of light-board columns of the light-board array of the light wall 100, the video data splitter 120 divides an image frame into a plurality of column areas, and each of the column areas includes at least one pixel column. The video data splitter 120 may distribute/provide the pixel stream of each column area to a first light-board controller CON1 in a corresponding controller string, as shown in FIG. 1. Hereinafter, the light cabinet 110_31 and the light cabinet 110_41 are taken as examples for illustration. The description of the rest of the light cabinets of the light wall 100, such as the light cabinets, 110_11, 110_12, 110_13, 110_14, 110_21, 110_24, 110_34, and 110_44, may be deduced by referring to the related descriptions of the light cabinet 110_11 and/or the light cabinet 110_12, so the description is not redundant.

The light cabinet 110_41 includes the light boards and the light-board controllers CON1. The number of the light boards of the light cabinet 110_41 may be determined according to actual design. The light boards of the light cabinet 110_41 form a light-board array of the light cabinet 110_41. For example, the light cabinet 110_41 shown in FIG. 1 includes 4*2 light boards, such as a light board 111_71 and a light board 111_81 shown in FIG. 1. The resolution of the light array of each light board of the light cabinet 110_41 may be determined according to actual design. For example, in the embodiment shown in FIG. 1, the resolution of the light array of each light board of the light cabinet 110_41 may be 240*270. By analogy, the light board of the light cabinet 110_31 includes 4*2 light boards, such as a light board 111_51 and a light board 111_61 shown in FIG. 1.

As shown in FIG. 1, the light-board controllers CON1 of the light cabinet 110_41 are configured one-to-one on the light boards of the light cabinet 110_41. The light-board controllers CON1 of the light boards 111_71 and 111_81 in the first column of the light-board array of the light cabinet 110_41 are connected in series to form a controller string (a first controller string). According to actual design, in some embodiments, the light-board controllers CON1 in the first controller string of the light cabinet 110_41 may be mutually connected in series using a low-voltage differential Signaling (LVDS) interface. As the LVDS interface is a well-known interface, its description is omitted here. In other embodiments, these light-board controllers CON1 in the first controller string of the light cabinet 110_41 may be mutually connected in series through the V-by-One HS (generally referred to as Vx1) interface. As the Vx1 interface is a well-known interface, its description is also omitted here.

The output terminal of the first controller string of the light cabinet 110_41 may be connected electrically to the input terminal of the controller string in a corresponding column of the light-board array of the light cabinet 110_31 (for example, a second controller string in which the light-board controllers CON1 of the light boards 111_51 and 111_61 are connected in series). According to actual design, in some embodiments, the output terminal of the first controller string of the light cabinet 110_41 is connected electrically to the input terminal of the second controller string of the light cabinet 110_31 through the LVDS interface. In other embodiments, the output terminal of the first controller string of the light cabinet 110_41 is connected electrically to the input terminal of the second controller string of the light cabinet 110_31 through the Vx1 interface.

The input terminal of the first controller string of the light cabinet 110_41 may be connected electrically to the output terminal of the video data splitter 120 (or the output terminal of the controller string in the corresponding column of the light-board array of other light cabinets). According to actual design, in some embodiments, the input terminal of the first controller string of the light cabinet 110_41 is connected electrically to the output terminal of the video data splitter 120 (or the output terminal of the controller string of other light cabinets) through the LVDS interface. In other embodiments, the input terminal of the first controller string of the light cabinet 110_41 may be connected electrically to the output terminal of the video data splitter 120 (or the output terminal of the controller string of other light cabinets) through the Vx1 interface.

In the embodiment shown in FIG. 1, the input terminal of the light-board controller CON1 in the first controller string of the light cabinet 110_41 is connected electrically to the output terminal of the video data splitter 120 to receive a pixel stream of a corresponding column area in an image frame. Corresponding to the light boards in the first light-board column of the light cabinets 110_11, 110_21, 110_31, and 110_41, the corresponding column area is divided into a plurality of sub-areas. The light-board controller CON1 of the light board 111_81 retrieves the pixel data of a corresponding sub-area from the pixel stream, and pass the pixel stream to the light-board controller CON1 of the next light board 111_71. The light-board controller CON1 of the light board 111_71 retrieves the pixel data of another corresponding sub-area from the pixel stream, and pass the pixel stream to the light-board controller CON1 of the next light board 111_61.

By analogy, these light-board controllers CON1 of the light boards in the second column of the light-board array of the light cabinet 110_41 are connected in series to form another controller string (a fourth controller string). The output terminal of the fourth controller string of the light cabinet 110_41 may be connected electrically to the input terminal of a controller string (a fifth controller string) in another corresponding column of the light-board array of the light cabinet 110_31. The input terminal of the fourth controller string of the light cabinet 110_41 may be connected electrically to the output terminal of the video data splitter 120 (or the output terminal of the controller string in the corresponding column of the light-board array of other light cabinets).

By analogy, the light-board controllers CON1 of the light cabinet 110_31 are configured one-to-one on the light boards of the light cabinet 110_31, where the light-board controllers CON1 of the light boards 111_51 and 111_61 in the first column of the light-board array of the light cabinet 110_31 are connected in series to form a controller string (a second controller string). The output terminal of the second controller string of the light cabinet 110_31 may be connected electrically to the input terminal of the controller string in a corresponding column of the light-board array of the light cabinet 110_21. The input terminal of the second controller string of the light cabinet 110_31 may be connected electrically to the output terminal of the controller string in a corresponding column of the light-board array of the light cabinet 110_41.

Based on the above, each of the light cabinets 110_11 to 110_44 of the light wall 100 does not need to be equipped with a light-cabinet controller. In the embodiment shown in FIG. 1, the video data splitter 120 sends the pixel data stream directly to at least one light-board controller CON1 of the light cabinet 110_41. In the embodiment shown in FIG. 1, a light-board controller string of the light cabinet 110_41 sends the pixel data stream directly to a corresponding light-board controller string of the light cabinet 110_31.

Figure 2:
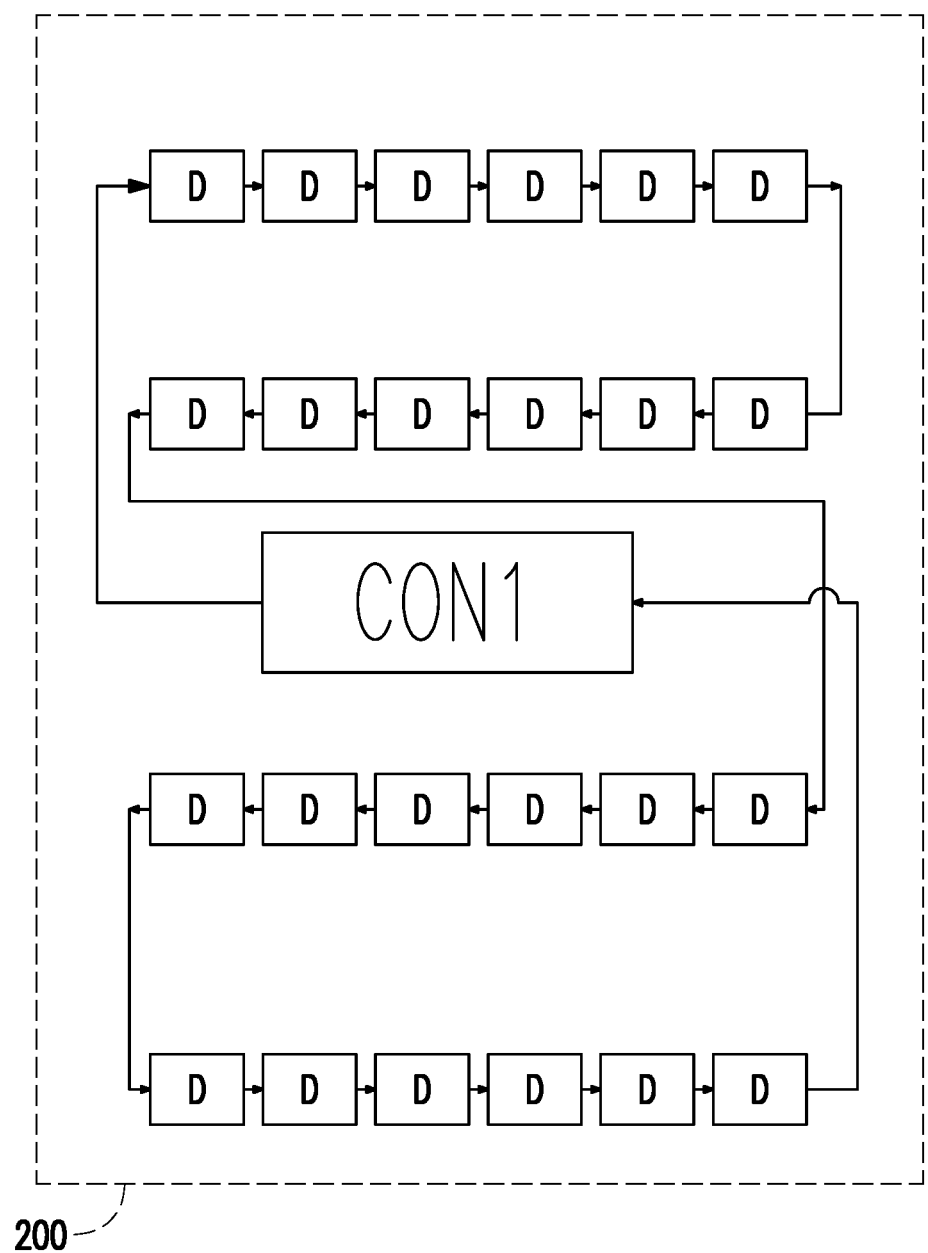
FIG. 2 is a schematic diagram of a circuit block of a light board according to an embodiment of the present disclosure.

FIG. 2 is a schematic diagram of a circuit block of a light board 200 according to an embodiment of the present disclosure. The descriptions of any light board shown in FIG. 1 (for example, the light boards 111_51, 111_61, 111_71, and/or 111_81) and any light-board controller CON1 may be analogized with reference to the related description of the light board 200 and the light-board controller CON1 shown in FIG. 2. The descriptions of the light board 200 and the light-board controller CON1 shown in FIG. 2 may be the reference of any light board and any light-board controller CON1 in FIG. 1. In the embodiment shown in FIG. 2, the light board 200 includes a light array (not shown) and a plurality of driver circuits D. According to actual design, the light array (not shown) may include a plurality of light-emitting diodes (LED) or other light-emitting elements. The driver circuits D may drive the light array (not shown) of the light board 200. This embodiment does not limit the driving operation of the driver circuit D. For example, the driving operations of the driver circuits D may include conventional driving operations or other driving operations.

The light-board controller CON1 of the light board 200 may receive a pixel stream corresponding to the column area in an image frame from the video data splitter (not shown in FIG. 2; which may be, for example, the video data splitter 120 shown in FIG. 1) or the light-board controller of the previous light board (not shown in FIG. 2; whose description may refer to, for example, the relevant description of the light board 111_71 shown in FIG. 1). Corresponding to the position of the light board 200 in the light wall, the light-board controller CON1 of the light board 200 may retrieve the pixel data of a corresponding sub-area from the pixel stream, and then provide the pixel data stream of the corresponding sub-area to the driver circuit D of the light board 200. Furthermore, the light-board controller CON1 of the light board 200 may transmit the pixel stream to the light-board controller of the next light board (not shown in FIG. 2).

The driver circuits D of the light board 200 are connected in series to form a driver circuit string. According to actual design, in some embodiments, the driver circuits D in the light board 200 are mutually connected in series using a mini low-voltage differential signaling (mini-LVDS) interface or other interfaces. The input terminal of the driver circuit string of the light board 200 is coupled to the output terminal of the light-board controller CON1 (corresponding to the light-board controller) of the light board 200 to receive the pixel data stream of the corresponding sub-area. According to actual design, in some embodiments, the input terminal of the driver circuit string in the light board 200 may be coupled to the light-board controller CON1 of the light board 200 through a mini-LVDS interface or other interfaces.

The input terminal of any driver circuit D in the driver circuit string shown in FIG. 2 is connected electrically to the output terminal of the previous driver circuit D (or the output terminal of the light-board controller CON1) to receive the pixel data stream of the corresponding sub-area. Corresponding to the position of the light array (not shown) driven by the driver circuit D in the light board 200, the driver circuit D may retrieve a plurality of corresponding pixel data from the pixel data stream, and transfer the pixel data stream to the driver circuit D. Therefore, the driver circuits D of the light board 200 are controlled by the light-board controller CON1 of the light board 200 to drive the light array (not shown) of the light board 200.

According to actual design, the output terminal of the driver circuit string of the light board 200 may be coupled to the input terminal of the light-board controller CON1 of the light board 200. In some embodiments, the output terminal of the driver circuit string in the light board 200 is coupled to the input terminal of the light-board controller CON1 of the light board 200 through a mini-LVDS interface (or other interfaces). Therefore, the driver circuits D report feedback information (such as open circuits, circuit breaks, and other related information) to the light-board controller CON1.

Based on the above, the driver circuits D of the light board 200 shown in FIG. 2 are connected in series to form a driver circuit string. In the light board 200, the output terminal of the light-board controller CON1 only needs to be connected electrically to the input terminal of one driver circuit D in the driver circuit string, and does not need to be connected electrically to the input terminal of every driver circuit D. Therefore, the number and length of wires between the light-board controller CON1 and the driver circuits D may be reduced evidently.

Figure 3:
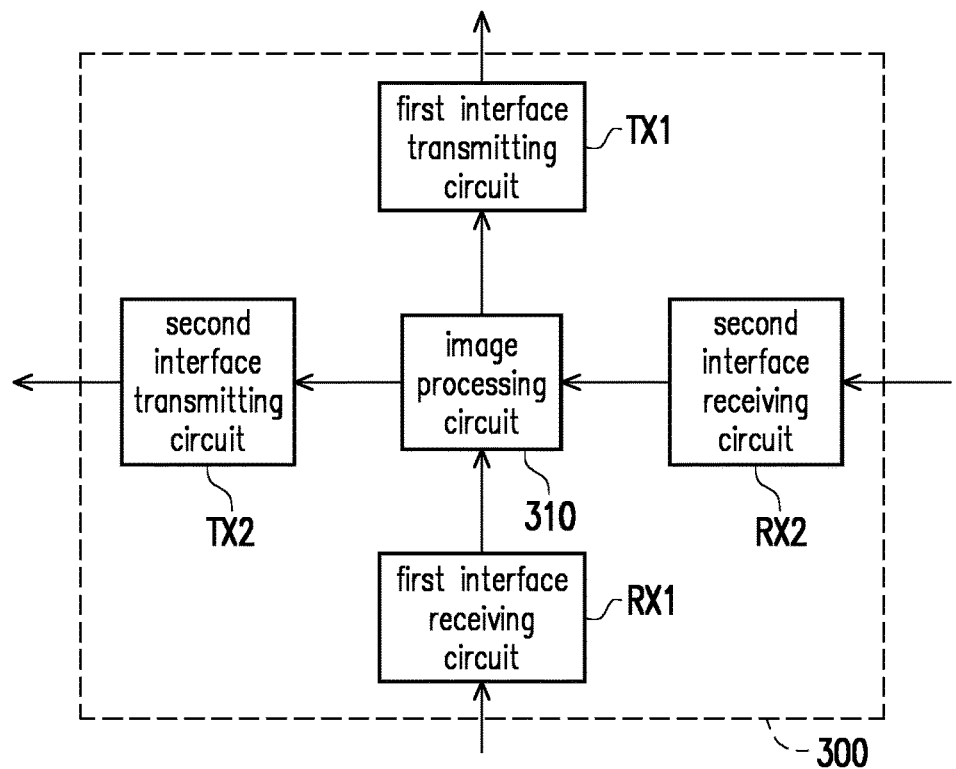
FIG. 3 is a schematic diagram of a circuit block of a light-board controller according to an embodiment of the present disclosure.

FIG. 3 is a schematic diagram of a circuit block of a light-board controller 300 according to an embodiment of the present disclosure. The descriptions of any light-board controller CON1 shown in FIG. 1 and/or the light-board controller CON1 shown in FIG. 2 may be the reference of the light-board controller 300 shown in FIG. 3. The light-board controller 300 shown in FIG. 3 may be the reference of any light-board controller CON1 shown in FIG. 1 and/or the light-board controller CON1 shown in FIG. 2.

In the embodiment shown in FIG. 3, the light-board controller 300 includes a first interface receiving circuit RX1, a first interface transmitting circuit TX1, a second interface receiving circuit RX2, a second interface transmitting circuit TX2, and an image processing circuit 310. The first interface receiving circuit RX1 may receive the pixel stream from the output terminal of the video data splitter (not shown in FIG. 3; which may be, for example, the video data splitter 120 shown in FIG. 1) or the output terminal of the previous light-board controller (not shown in FIG. 3). The first interface receiving circuit RX1 may output the pixel stream to the image processing circuit 310. According to actual design, in some embodiments, the first interface receiving circuit RX1 is a receiver circuit that is compliant with the LVDS interface specification (or other interface specifications).

The image processing circuit 310 is coupled between an output terminal of the first interface receiving circuit and an input terminal of the first interface transmitting circuit. The light-board controller 300 may transmit the pixel stream to the first interface transmitting circuit TX1, and the first interface transmitting circuit TX1 may output the pixel stream to the next light-board controller (not shown in FIG. 3). According to actual design, in some embodiments, the first interface transmitting circuit TX1 may be a transmitter circuit compliant with the LVDS interface specification (or other interface specifications). According to actual design, in some embodiments, the first interface transmitting circuit TX1 is a transmitter circuit that is compliant with the LVDS interface specification (or other interface specifications).

In addition, the image processing circuit 310 of the light-board controller 300 may extract pixel data of a corresponding sub-area from the pixel stream, and then provide the pixel data stream of the corresponding sub-area to the second interface transmitting circuit TX2. The input terminal of the second interface transmitting circuit TX2 is coupled to the image processing circuit 310 to receive the pixel data stream of the corresponding sub-area of the image frame. The second interface transmitting circuit TX2 may provide the pixel data stream to the driver circuit (not shown in FIG. 3; which may be, for example, the driver circuit D shown in FIG. 2). According to actual design, in some embodiments, the second interface transmitting circuit TX2 is a transmitter circuit that is compliant with the mini-LVDS interface specification (or other interface specifications).

The output terminal of the second interface receiving circuit RX2 is coupled to the image processing circuit 310. The second interface receiving circuit RX2 may receive feedback information from at least one driver circuit (not shown in FIG. 3; which may be, for example, the driver circuit D shown in FIG. 2) of the corresponding light board, and then provide the feedback information to the image processing circuit 310. The image processing circuit 310 may feed the feedback information back to the system through the first interface transmitting circuit TX1.

Figure 4:
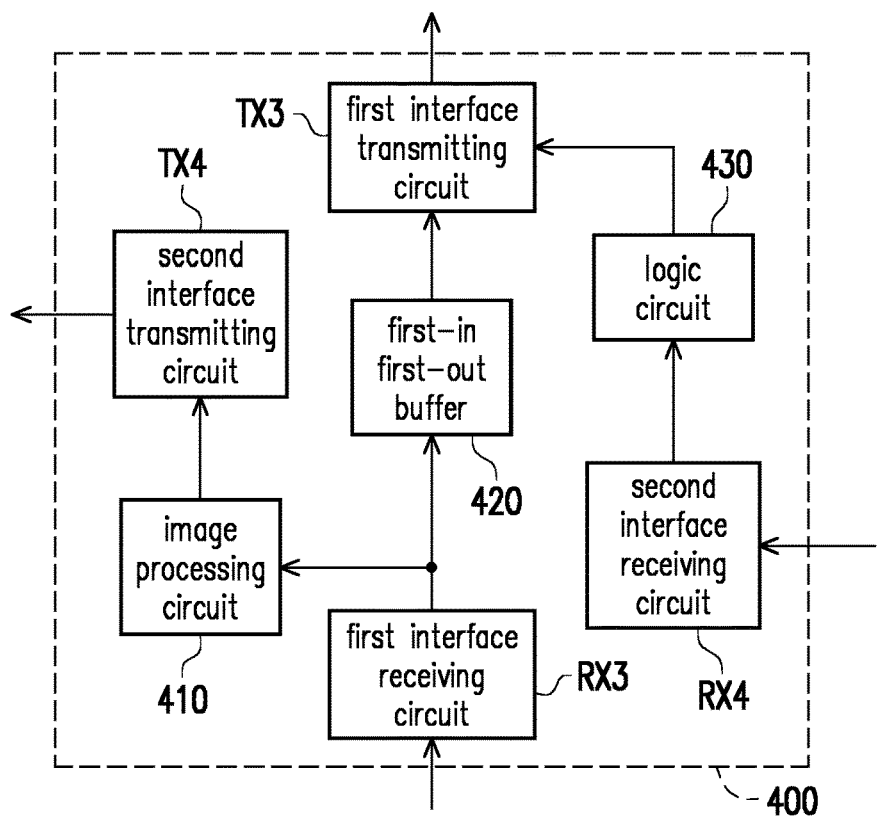
FIG. 4 is a schematic diagram of a circuit block of a light-board controller according to another embodiment of the present disclosure.

FIG. 4 is a schematic diagram of a circuit block of a light-board controller 400 according to another embodiment of the present disclosure. The descriptions of any light-board controller CON1 shown in FIG. 1 and/or the light-board controller CON1 shown in FIG. 2 may be the reference of the light-board controller 400 shown in FIG. 4. The light-board controller 400 shown in FIG. 4 may be the reference of any light-board controller CON1 shown in FIG. 1 and/or the light-board controller CON1 shown in FIG. 2.

In the embodiment shown in FIG. 4, the light-board controller 400 includes a first interface receiving circuit RX3, a first interface transmitting circuit TX3, a second interface receiving circuit RX4, a second interface transmitting circuit TX4, an image processing circuit 410, an first-in first-out (FIFO) buffer 420, and a logic circuit 430. The descriptions of the first interface receiving circuit RX3, the first interface transmitting circuit TX3, the second interface receiving circuit RX4, and/or the second interface transmitting circuit TX4 shown in FIG. 4 may be referred to the related descriptions of the first interface receiving circuit RX1, the first interface transmitting circuit TX1, the second interface receiving circuit RX2, and/or the second interface transmitting circuit TX2 shown in FIG. 3, and thus they are not repeated here.

The FIFO buffer 420 is coupled between the output terminal of the first interface receiving circuit RX3 and the input terminal of the first interface transmitting circuit TX3. The first interface receiving circuit RX3 may output the pixel stream to the image processing circuit 410 and the FIFO buffer 420. The FIFO buffer 420 may pass the pixel stream to the first interface transmitting circuit TX3, and the first interface transmitting circuit TX3 may output the pixel stream to the next light-board controller (not shown in the FIG. 4).

The input terminal of the image processing circuit 410 is coupled to the output terminal of the first interface receiving circuit RX3 to receive the pixel stream. The image processing circuit 410 may extract pixel data of a corresponding sub-area from the pixel stream, and then provide the pixel data stream of the corresponding sub-area to the second interface transmitting circuit TX4. The input terminal of the second interface transmitting circuit TX4 is coupled to the image processing circuit 410 to receive the pixel data stream of the corresponding sub-area of the image frame. The second interface transmitting circuit TX4 may provide the pixel data stream to the driver circuit (not shown in FIG. 4; which may be, for example, the driver circuit D shown in FIG. 2). For the image processing circuit 410 shown in FIG. 4, reference may be made to the related description of the image processing circuit 310 shown in FIG. 3, and thus it is not repeated here.

The second interface receiving circuit RX4 may receive feedback information from at least one driver circuit (not shown in FIG. 4; which may be, for example, the driver circuit D shown in FIG. 2) of the corresponding light board, and then provide the feedback information to the logic circuit 430. The input terminal of the logic circuit 430 is coupled to the output terminal of the second interface receiving circuit RX4 to receive the feedback information. The output terminal of the logic circuit 430 is coupled to the first interface transmitting circuit RX3. The feedback information of the driver circuit may be returned to the system through the second interface receiving circuit RX4, the logic circuit 430, and the first interface transmitting circuit TX1.

According to different design requirements, the video data splitter 120, the light-board controller CON1, the image processing circuit 310, the image processing circuit 410, and/or the logic circuit 430 may be implemented in hardware, firmware, software (that is, a program), or a combination of the above three.

In terms of hardware, the video data splitter 120, the light-board controller CON1, the image processing circuit 310, the image processing circuit 410, and/or the logic circuit 430 may be implemented in a logic circuit on an integrated circuit. The related functions of the video data splitter 120, the light-board controller CON1, the image processing circuit 310, the image processing circuit 410, and/or the logic circuit 430 may be implemented as hardware by using hardware description languages (such as Verilog HDL or VHDL) or other suitable programming languages. For example, the related functions of the video data splitter 120, the light-board controller CON1, the image processing circuit 310, the image processing circuit 410, and/or the logic circuit 430 may be implemented in one or more controller, microcontroller, microprocessor, application-specific integrated circuit (ASIC), digital signal processor (DSP), field programmable gate array (FPGA), and/or all kinds of logic blocks, modules, and circuits in other processing units.

In terms of software and/or firmware, the related functions of the video data splitter 120, the light-board controller CON1, the image processing circuit 310, the image processing circuit 410, and/or the logic circuit 430 may be implemented as programming codes. For example, general programming languages (such as C, C++, or assembly language) or other suitable programming languages are used to implement the video data splitter 120, the light-board controller CON1, the image processing circuit 310, the image processing circuit 410, and/or the logic circuit 430. The programming codes may be recorded/stored in a "non-transitory computer readable medium." In some embodiments, the non-transitory computer-readable medium includes, for example, a read-only memory (ROM) and/or a storage device. The storage device includes a hard disk drive (HDD), a solid-state drive (SSD), or other storage devices.

A central processing unit (CPU), controller, microcontroller, or microprocessor read and execute the programming codes from the recording medium, and thereby implementing the related functions of the video data splitter 120, the light-board controller CON1, the image processing circuit 310, the image processing circuit 410, and/or the logic circuit 430.

Although the disclosure has been disclosed by the above embodiments, they are not intended to limit the disclosure. To any one of ordinary skill in the art, modifications and embellishment to the disclosed embodiments may be made without departing from the spirit and the scope of the disclosure. Accordingly, the scope of the disclosure is defined by the claims attached below and their equivalents.

What is claimed is:

1. A light cabinet, comprising:
   a plurality of light boards, adapted to form a first light-board array of the light cabinet; and
   a plurality of light-board controllers, configured one-to-one on the light boards, wherein the light-board controllers of the light boards in a first column of the first light-board array are mutually connected in series to form a first controller string, an output terminal of the first controller string is adapted to be connected electrically to an input terminal of a second controller string in a corresponding column of a second light-board array of another light cabinet, and an input terminal of the first controller string is adapted to be connected electrically to a first output terminal of a video data splitter or an output terminal of a third controller string in a corresponding column of a third light-board array of yet another light cabinet,
   wherein the light-board controllers in the first controller string are mutually connected in series through a low-voltage differential signaling interface.

2. The light cabinet according to claim 1, wherein the output terminal of the first controller string is connected electrically to the input terminal of the second controller string of the another light cabinet through the low-voltage differential signaling interface, and the input terminal of the first controller string is connected electrically to the first output terminal of the video data splitter or the output terminal of the third controller string of the yet another light cabinet through the low-voltage differential signaling interface.

3. The light cabinet according to claim 1, wherein the light-board controllers in the first controller string are mutually connected in series through a V-by-One HS interface, the output terminal of the first controller string is connected electrically to the input terminal of the second controller string of the another light cabinet through the V-by-One HS interface, and the input terminal of the first controller string is connected electrically to the first output terminal of the video data splitter or the output terminal of the third controller string of the yet another light cabinet through the V-by-One HS interface.

4. The light cabinet according to claim 1, wherein the light-board controllers of the light boards in a second column of the first light-board array are mutually connected in series to form a fourth controller string, an output terminal of the fourth controller string is adapted to be connected electrically to an input terminal of a fifth controller string in another corresponding column of the second light-board array of the another light cabinet, and an input terminal of the fourth controller string is adapted to be connected electrically to a second output terminal of the video data splitter or an output terminal of a sixth controller string in another corresponding column of the third light-board array of the yet another light cabinet.

5. The light cabinet according to claim 1, wherein any one of the light-board controllers comprises:
   a first interface receiving circuit;
   a first interface transmitting circuit;
   an image processing circuit, coupled between an output terminal of the first interface receiving circuit and an input terminal of the first interface transmitting circuit; and
   a second interface transmitting circuit, comprising an input terminal coupled to the image processing circuit to receive a pixel data stream of a corresponding sub-area of an image frame, and configured to provide the pixel data stream to at least one driver circuit of a corresponding light board of the light boards.

6. The light cabinet according to claim 5, wherein the any one of the light-board controllers further comprises:
   a second interface receiving circuit, comprising an output terminal coupled to the image processing circuit, and configured to receive feedback information from the at least one driver circuit of the corresponding light board.

7. The light cabinet according to claim 1, wherein any one of the light-board controllers comprises:
   a first interface receiving circuit;
   a first interface transmitting circuit;
   a first-in first-out buffer, coupled between an output terminal of the first interface receiving circuit and an input terminal of the first interface transmitting circuit;
   an image processing circuit, comprising an input terminal coupled to the output terminal of the first interface receiving circuit; and
   a second interface transmitting circuit, comprising an input terminal coupled to the image processing circuit to receive a pixel data stream of a corresponding sub-area of an image frame, and configured to provide the pixel data stream to at least one driver circuit of a corresponding light board of the light boards.

8. The light cabinet according to claim 7, wherein the any one of the light-board controllers further comprises:
   a second interface receiving circuit, configured to receive feedback information from the at least one driver circuit of the corresponding light board; and
   a logic circuit, comprising an input terminal coupled to the second interface receiving circuit to receive the feedback information, wherein an output terminal of the logic circuit is coupled to the first interface transmitting circuit.

9. The light cabinet according to claim 1, wherein any one of the light boards comprises:
   a light array; and
   a plurality of driver circuits, mutually connected in series to form a driver circuit string, wherein an input terminal of the driver circuit string is coupled to a corresponding light-board controller of the light-board controllers, and the driver circuits are controlled by the corresponding light-board controller to drive the light array.

10. The light cabinet according to claim 9, wherein the driver circuits are mutually connected in series through a mini low-voltage differential signaling interface, and the input terminal of the driver circuit string is coupled to the corresponding light-board controller through the mini low-voltage differential signaling interface.

11. A light cabinet, comprising:
    a plurality of light boards, adapted to form a light-board array of the light cabinet; and a plurality of light-board controllers, configured one-to-one on the light boards, wherein any one of the light boards comprises:

a light array; and a plurality of driver circuits, connected in series to form a driver circuit string, wherein an input terminal of the driver circuit string is coupled to a corresponding light-board controller of the light-board controllers, and the driver circuits are controlled by the corresponding light-board controller to drive the light array, wherein the light-board controllers in a first controller string are mutually connected in series through a low-voltage differential signaling interface.

12. The light cabinet according to claim 11, wherein the light-board controllers of the light boards in a first column of the light-board array are connected mutually in series to form the first controller string.

13. The light cabinet according to claim 11, wherein the light-board controllers of the light boards in a first column of the light-board array are connected mutually in series to form a first controller string, and the light-board controllers in the first controller string are mutually connected in series through a V-by-One HS interface.

14. The light cabinet according to claim 11, wherein the light-board controllers of the light boards in a first column of the light-board array are connected mutually in series to form a first controller string, and the light-board controllers of the light boards in a second column of the light-board array are mutually connected in series to form a second controller string.

15. The light cabinet according to claim 11, wherein any one of the light-board controllers comprises:

a first interface receiving circuit;

a first interface transmitting circuit;

an image processing circuit, coupled between an output terminal of the first interface receiving circuit and an input terminal of the first interface transmitting circuit; and a second interface transmitting circuit, comprising an input terminal coupled to the image processing circuit to receive a pixel data stream of a corresponding sub-area of an image frame, and configured to provide the pixel data stream to the input terminal of the driver circuit string of a corresponding light board of the light boards.

16. The light cabinet according to claim 15, wherein the any one of the light-board controllers further comprises:

a second interface receiving circuit, comprising an output terminal coupled to the image processing circuit, and configured to receive feedback information from an output terminal of the driver circuit string of the corresponding light board.

17. The light cabinet according to claim 11, wherein any one of the light-board controllers comprises:

a first interface receiving circuit;

a first interface transmitting circuit;

a first-in first-out buffer, coupled between an output terminal of the first interface receiving circuit and an input terminal of the first interface transmitting circuit;

an image processing circuit, comprising an input terminal coupled to the output terminal of the first interface receiving circuit; and a second interface transmitting circuit, comprising an input terminal coupled to the image processing circuit to receive a pixel data stream of a corresponding sub-area of an image frame, and configured to provide the pixel data stream to the input terminal of the driver circuit string of a corresponding light board of the light boards.

18. The light cabinet according to claim 17, wherein the any one of the light-board controllers further comprises:

a second interface receiving circuit, configured to receive feedback information from an output terminal of the driver circuit string of the corresponding light board; and a logic circuit, comprising an input terminal coupled to an output terminal of the second interface receiving circuit to receive the feedback information, wherein an output terminal of the logic circuit is coupled to the first interface transmitting circuit.

19. The light cabinet according to claim 11, wherein the driver circuits are mutually connected in series through a mini low-voltage differential signaling interface, and the input terminal of the driver circuit string is coupled to the corresponding light-board controller through the mini low-voltage differential signaling interface.

* * * * *